United States Patent [19]

Simelunas

[11] Patent Number: 4,534,726
[45] Date of Patent: Aug. 13, 1985

[54] APPARATUS HAVING SHIMS UNDERLYING PORTIONS OF A DIE

[75] Inventor: William J. Simelunas, Glen Rock, N.J.

[73] Assignee: Nabisco Brands, Inc., Parsippany, N.J.

[21] Appl. No.: 540,983

[22] Filed: Oct. 11, 1983

[51] Int. Cl.³ .................. A21C 5/00; A21C 11/10; B29C 17/08
[52] U.S. Cl. .................... 425/363; 425/298; 425/308
[58] Field of Search ............... 83/427, 658; 425/296, 425/308, 312, 315, 363, 142, 145, 289, 298, 383, 394, 403.1

[56] References Cited

U.S. PATENT DOCUMENTS

| | | | |
|---|---|---|---|
| 873,396 | 12/1907 | Walters | 425/363 |
| 1,882,160 | 10/1932 | Paris | 425/363 |
| 2,886,847 | 5/1959 | Herr | 425/363 |
| 4,261,940 | 4/1981 | Bussey | 425/304 |
| 4,308,005 | 12/1981 | Zundel | 425/304 |

Primary Examiner—Willard E. Hoag
Attorney, Agent, or Firm—Richard Kornutik

[57] ABSTRACT

An apparatus acts upon an extrudate rope to form individual elements of predetermined size and shape which are separated from one another by a predetermined space. A die is used having a predetermined shape with indentations therein to press the extrudate rope against a support at predetermined locations. A conveyor belt is used to carry the extrudate rope in one direction, and the die is supported such that during the pressing operation the die forward speed matches the extrudate rope forward speed. A supporting table underlies the conveyor belt. At least two shims are placed under the conveyor belt on either side of the path of the extrudate rope and underlying the path of the die so that portions of the extrudate rope which are pressed beneath the die are forced from under the die toward the indentations formed in the die so as to minimize waste of portions of the extrudate rope.

29 Claims, 9 Drawing Figures

APPARATUS HAVING SHIMS UNDERLYING PORTIONS OF A DIE

BACKGROUND OF THE INVENTION

In the production of individual pieces from a continuous extrudate rope, efforts have been made to form individual pieces which are both regular and uniform, and at the same time which do not leave a high percentage of waste or scrap material. For example, in forming individual pieces from a single extrudate rope, it is known to simply stamp the rope with a die having the shape of the article desired therein. Although somewhat successful, this practice generally results in a relatively high percentage of waste or scrap of the extrudate rope. In another type of cutter, shown in copending application U.S. Ser. No. 06/507,401, an extrudate rope is cut into pieces leaving generally triangular pieces of scrap. The extrudate rope may be formed with a core of a first composition, and an outer layer of a second composition. In the aforesaid application, two curved blades are employed in cutting the exrudate rope, however the volume between opposing pairs of the blades is left open so that generally triangular pieces of scrap will remain after cutting. Where the volume between each pair of blades is filled in, the inner dough of the extrudate, which may be of a different composition than the outer dough portions, is squeezed away from the scrap portions and toward the central portions of the pieces to be formed. Thus, the triangular scrap portions are substantially composed of the outer layer, and not the core composition; however, in the case where the core material has particulate matter such as chocolate chip pieces, the particulate matter or chip pieces is not squeezed away from the scrap pieces, but rather remains with the scrap.

In stamping of an extrudate rope, waste occurs during stamping due to spreading of the extrudate rope while under pressure by the die. Thus, portions of the extrudate rope will flow beyond the regions desired for formation of a regular article. Although it is known in the prior art to recover such scrap and attempt to reuse it, this is not always satisfactory.

Recycling of scrap pieces of extrudate rope in the food industry, for example, may be objectionable in cases where the extrudate toughens with exposure to air or otherwise becomes unsuitable for reuse in the stamping operation. Also, where the extrudate rope is formed of two or more materials arranged in different regions to achieve a specific resultant product, recycling of scrap pieces is completely unsatisfactory because such scrap will generally be of a mixture of materials which cannot readily be separated for reuse in an appropriate manner. For example, an extrudate rope may be a cookie dough having an inner core of one type of dough having a first predetermined property with an outer layer surrounding the inner core of a different dough material having a second predetermined property. Thus, scrap pieces generally cannot be recycled from an extrudate rope of this type.

In the prior art stamping operation of Ser. No. 06/507,401, described above, wherein each individual piece is stamped and formed by two opposing blades of the die in a two-stroke operation, highly regular pieces are formed.

It is desirable in any stamping operation that a large number of pieces be formed from an extrudate rope in a minimum amount of time, both to conserve labor costs as well as to conserve floor space taken up by equipment used in the manufacture of such pieces. It is therefore desirable that a plurality of extrudate ropes by operated upon by a single machine simultaneously, thereby permitting a single operator to tend to such machine and for such machine to be arranged in a compact manner to conserve floor space.

SUMMARY OF THE INVENTION

It is accordingly an object of the present invention to provide an apparatus for forming individual pieces from an extrudate rope which minimizes scrap losses.

It is a further object of the present invention to provide an improved apparatus for forming individual pieces from an extrudate rope, wherein a support underlies a die for stamping individual pieces from an extrudate rope in a multi-step operation and wherein shims are disposed under the die and overlying the support, and lying along either side of the path of the extrudate rope.

It is a still further object of the present invention to provide an apparatus for forming individual pieces from an extrudate rope having a die, an extrudate rope carried by a conveyor belt, and an underlying support; and shims disposed on either side of the path taken by the extrudate rope, such that extrudate rope material is forced from either side of the extrudate rope toward an indentation in the die so as to minimize scrap.

It is yet a further object of the present invention to provide an improved die for forming individual pieces from an extrudate rope, wherein the individual pieces are not completely identical or uniform.

It is a still further object of the present invention to provide an improved stamping process and die for forming non-identical pieces from an extrudate rope, wherein a single die has an indentation on a leading edge as well as on a trailing edge so that an individual piece is formed along its forward edge by the leading edge of the die and in a second stamping operation a trailing edge of the individual piece is formed by the trailing edge of the die.

It is a further object of the present invention to provide an improved support for a stamping device, wherein shims underlie an article having fluidic properties during a stamping operation, in areas wherein the fluidic extrudate rope is not desired to flow under the die.

It is a further object of the present invention to provide an improved apparatus for forming somewhat irregular pieces from a extrudate rope, wherein the apparatus has a movable die for stamping, a rope carried by a conveyor belt over a supporting table, shims disposed in generally parallel strips under the conveyor belt on the table on either side of an extrudate rope, the die being forced to travel in the same direction as the conveyor belt at the same speed as the conveyor belt during the stamping operation, so that extrudate material flows from areas under the die where pieces are not to be formed to areas of the die where pieces are desired to be formed.

Further details and advantages of the present invention appear from the following description of a preferred embodiment shown schematically in the drawings.

DETAILED DESCRIPTION OF THE INVENTION

Figure 1:
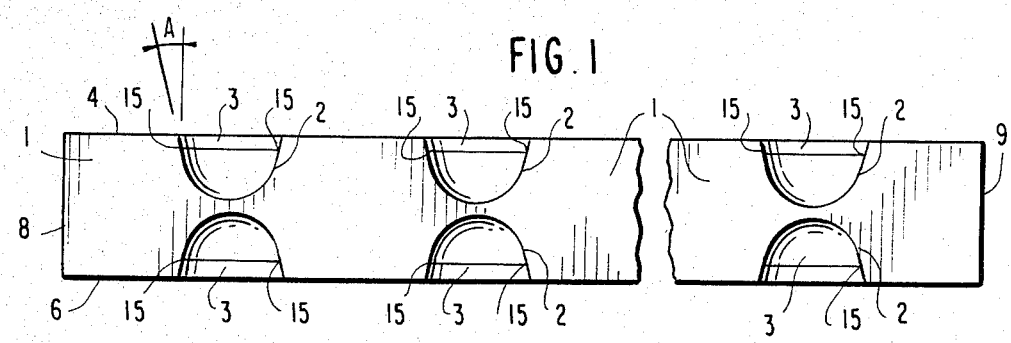
FIG. 1 is a bottom elevational view of a die of the present invention, showing indents therein.

A bottom surface 1 of a die is shown in FIG. 1. Edges 2 lie along the bottom surface 1 of the die, and outline the bottom terminus of indentations 3. Edge 4 of the die is the leading edge of the die, and accepts a leading edge of extrudate rope to be formed into smaller, individual pieces.

A trailing edge 6 of the die is shown, and also has formed therein indentations 3 with terminus edge 2 lying in the plane of bottom surface 1. The trailing edge 6 is used to form the trailing edge of pieces of extrudate by operating upon an extrudate rope 10 having a leading edge formed by the die leading edge 4.

The die of FIG. 1 is shown as having a plurality of indentations 3. Left end 8 and right end 9 of the die are shown. Any number of opposing indentations 3 may be used, as well as any die length, as indicated generally by the broken lines in FIG. 1. In a preferred embodiment, there are seven pairs of opposing indentations 3. Nonetheless, it is contemplated that a single pair of opposed indentations may be used in the present invention, or any other number of pairs of opposed indentations spaced along a die.

The die of the present invention is shown in FIG. 1 as a prismatic solid. However, any die configuration may be used so long as it has a generally planar bottom surface between said opposing indentations 3 and appropriately shaped indentations. For example, a rectangular bar need not be used, instead a hexagonal bar could be used, or even a hollowed bar so long as the hollows did not open into indentations 3. Also, any material may be used for the die, although in a preferred embodiment the material is steel.

Note in FIG. 1 that the leading and trailing terminus edges 5 of the indentations 3 along the die open at a slight angle A. This slight opening permits somewhat smoother entry of the extrudate rope into the indentations 3 of the die during the stamping operation. An intersection 15 is shown in FIG. 2 of the angled entry from terminus edges 5 into indentations 3.

Figure 2:
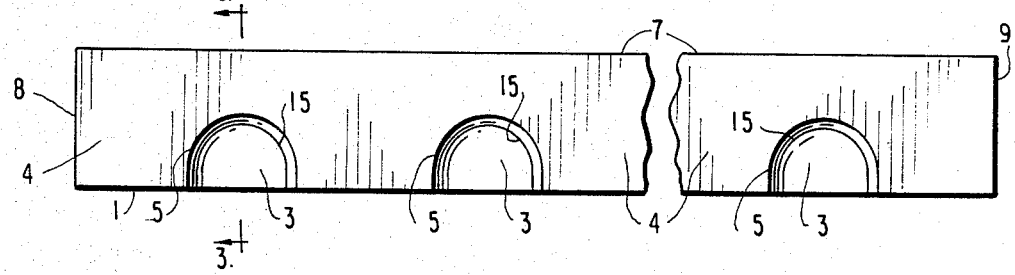
FIG. 2 is a front elevational view of the improved die of the present invention.

Front terminus edges 5 of indentations 3 are also shown in FIG. 2. Leading edge 4 of the die is shown as a generally planar surface with edges 5 being generally coplanar with the leading edge 4. Top edge 7 of the die is also shown in the figure. In a preferred embodiment, edge 7 is shown as a planar surface parallel with the lower edge 1. However, it is contemplated that any shape of top edge 7 may be used, for example, semi-cylindrical, pyramidal, hollowed out, and the like. Furthermore, as in the discussion relating to FIG. 1 above, although a specific number of indentations 3 are shown in FIG. 2, it is contemplated that any number of opposing pairs of indentations may be used.

Figure 3:
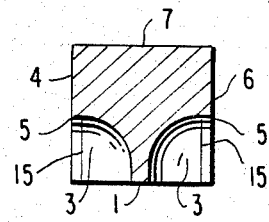
FIG. 3 is a side sectional view taken along line 3—3 of FIG. 2 showing a profile of opposing indents formed along either edge of a die.

FIG. 3 is a sectional view taken along the midpoint of a pair of opposed indentations in the direction parallel to the path of extrudate rope, the view of FIG. 3 being taken along line 3—3 in FIG. 2. The interior edge of the deepest portion of each of indentations 3 is shown.

Although a somewhat sperical inner surface is shown for indentations 3, any interior surface shape may be used. For example, it is contemplated that a portion of an elipsoidal surface may be used. Furthermore, any prismatic surface shape 3 may be used as well, for example, the interior surface may conform to that of a regular prismatic rectangual solid, or a prismatic solid having a pyramidal surface, or a combination of prismatic and curvalinear surfaces. Additionally, indentations 3 may have patterns formed therein so that during a stamping operation surfaces of pieces of designs may be formed on the rope extrudate surface.

Figure 4:
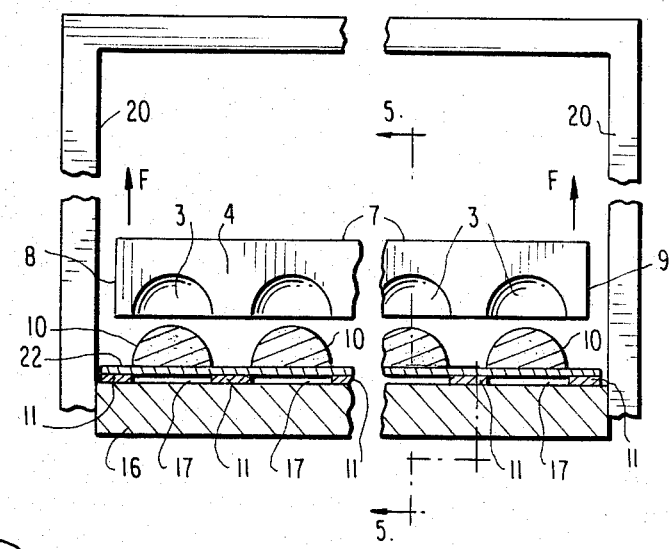
FIG. 4 is a front elevational view of the improved apparatus of the present invention, showing the improved die, extrudate ropes, and underlying shims.

In FIG. 4 is shown a front view of the apparatus of the present invention. A support member 20 for the die is shown schematically and may be any of the known, conventional prior art supports for supporting and moving the die. For example, it is known in the prior art to drive the die upward against a spring and then release the die in a downward direction for the next stamping operation. Any conventional motor or flywheel or other similar drive may be used to accomplish this as is well-known in the art. The driving means resultant force F is shown schematically in FIG. 4 and an arrow is shown indicating a generally upward force applied to the die. Inasmuch as it is also known in the prior art to drive a die both in an upward direction as well as in a downward direction, a spring need not be used but rather the drive means may drive the die upward as well as downward during successive stamping operations.

A front view of surface 4 of the die is seen in FIGS. 4, with the die on an upstroke in the stamping operation. An extrudate rope 10 is shown in cross section. The extrudate rope 10 is carried on conveyor belt 22, which is also shown in cross section.

A support 16 underlies the conveyor belt 22, and is also shown in cross section in FIG. 4. The support 16 has a top surface 17. The support 16 is sufficiently rigid and strong to permit stamping.

Along either side of each extrudate rope 10 is a shim strip 11. The shim strips 11 may be of resilient material such as spring steel, hard rubber, bronze, steel, or the like if so desired. Nonetheless, shim strips 11 can be formed from any sufficiently strong material, including materials that are not resilient, such as ceramic materials, and the like, although in this case the applied die forces must be selected to avoid immediate fracture of such materials. The shim strip 11 is shown in cross section in FIG. 4 and has parallel opposing top and bottom surfaces as well as vertical surfaces adjacent each side of each extrudate rope. Therefore, each shim strip 11 underlies that portion of the die which lies between indentations 3, and along a line orthogonal to leading surface edge 4 as seen in FIG. 4. Each shim 11 is approximately 0.015 inch in thickness. Thus, during a stamping operation, initial deformation of the extrudate rope 10 by the bottom surface 1 of the die tends to cause deformation of the extrudate rope in the vicinity of the die in an outward direction. This spreading of the extrudate rope would result in relatively high scrap losses since those portions of the extrudate rope which spread beyond the appropriate indentations 3 are flattened by the die and spread between indentations 3. It is known to recover and recycle or reuse scrap portions in a stamping operation. However, such reuse or recycling of scrap pieces is not suitable where the extrudate is formed of two dissimilar materials, such as, an inner core of a cookie dough having a first composition and a second, outer layer of cookie dough having a second composition which would result in a bakery product having unique properties. Furthermore, such recycling or reuse is inappropriate where such recycling or reuse results in hardening or other alteration of the properties of the scrap materials. In the case of an extrudate rope which is formed of two dissimilar materials used to achieve a unique bakery product, the scrap pieces would be mixtures of the two materials. Such scrap pieces could not be reused in either the inner core material layer or the outer surrounding layer since the composition of the scrap pieces could not reliably be expected to be either a pure composition of the outer material or of the inner core material. Thus, such scrap pieces would ordinarily be wasted in a stamping operation. Thus, it is important that such scrap be minimized to avoid waste and inefficiency. Shims 11 reduce such scrap losses, by forcing more of the extrudate rope 10 toward the areas under indentations 3.

Figure 5:
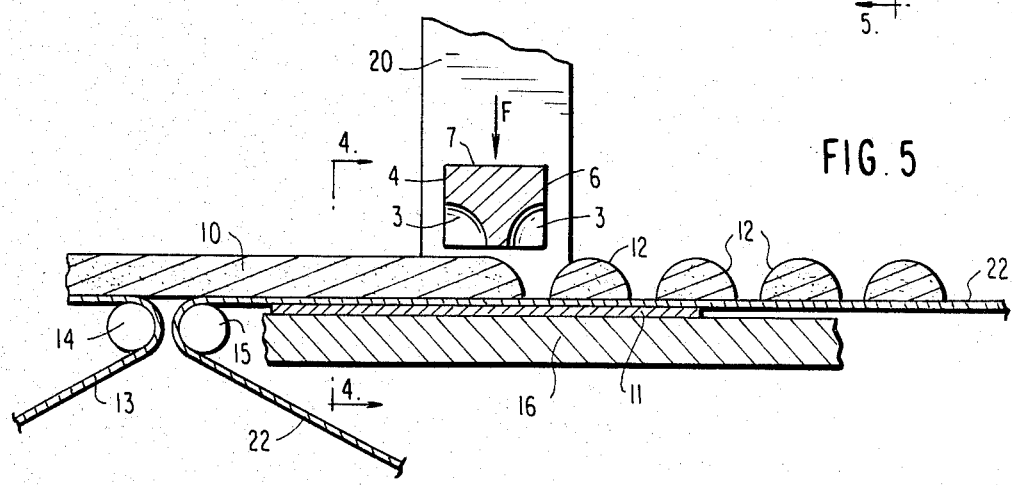
FIG. 5 is a view taken partially in section along line 5—5 of FIG. 4, showing the extrudate rope formed into individual pieces.

FIG. 5 is a side view in partial cross section taken along the line 5—5 of FIG. 4, and shows a cross section of the die similar to that shown in FIG. 3. Also, shown is a side view of an extrudate rope 10, as well as the stamped pieces 12 formed by the stamping operation.

Shims 11 are shown in FIG. 5 in cross section. As can be seen, each shim 11 extends well in front of the leading edge 4 of the die and well behind the trailing edge 6 of the die. The shim 11 is shown as supported by table 16. Conveyor belt 22, which supports extruded rope 10 as well pieces 12, is shown mounted in conventional manner upon a roller 15. A conventional feed conveyor belt 13 is shown, mounted in conventional fashion upon a roller 14. The present invention, however, is not limited to any particular conveyor belt arrangement. Any conveyor belt arrangement or support may be used. The embodiment shown in FIG. 5 is used merely for illustration purposes.

Figure 6:
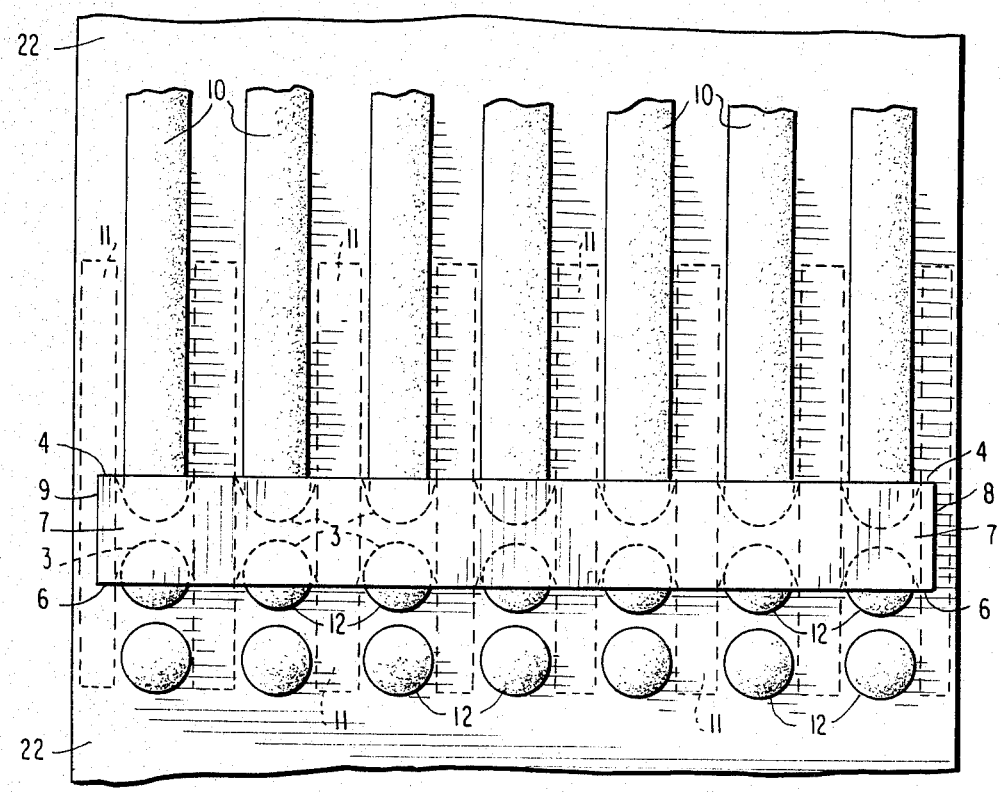
FIG. 6 is a top plan view of the improved apparatus of the present invention, showing the top of the die, dotted outlines of the indents formed in the die, the conveyor belt, and dotted outlines of the shims used in the invention.

FIG. 6 is a top plan view of the apparatus of the present invention. Top surface 7 of the die is shown in a position of bottom dead center. In this position, the die is firmly pressed against the conveyor belt 22 and has formed a leading edge of the extrudate rope 10 by the indentation 3 formed in leading edge 4 of the die, and has formed a separation and a trailing edge of a piece 12 by the indentation 3 in trailing edge 6 of the die. In this position, the forward die speed matches the conveyor belt 22 forward speed.

A dotted outline of shims 11 is clearly shown in FIG. 6. Overlying the shims as shown in FIG. 6 is the conveyor belt 22. The direction of travel of the extrudate rope and conveyor belt in FIG. 6 is from top to bottom.

Figure 7:
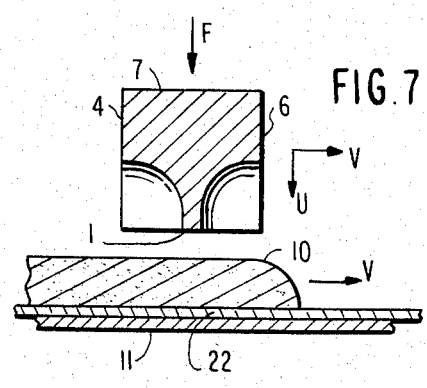
FIG. 7 is a side view in section of the die in extrudate rope showing the relative directions of travel of each.

FIG. 7 shows a downward stroke of the die in stamping operation. As can be seen from the drawing, the extrudate rope 10 has a velocity V in the righthand direction. Matching this velocity V in the righthand direction, is the die. The die also has a downward component of velocity U. The downward velocity U allows the die to perform the stamping operation.

The forward velocities V of the die and extrudate rope 10 match in order to ensure that during the stamping operation no deformation of extrudate rope occurs due to different relative velocities of portions of the extrudate rope under the die in the conveyor belt. Thus the extrudate rope and conveyor belt move with the same velocity, and so does the die, whereby all analysis and calculations of the stamping operation may consider the extrudate rope 10, the conveyor belt 22, and the die to be at rest in one frame of reference.

Figure 8:
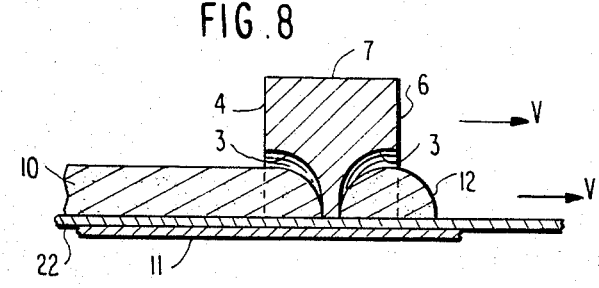
FIG. 8 is a side view in section of the die at its bottom dead center of travel forming individual pieces from the extrudate rope.

FIG. 8 shows a cross section of the die in its position of bottom dead center. In this position, the die has no upward or downward component of velocity U; instead it has only forward velocity V matching that of the extrudate rope 10 and conveyor belt 22. Note that the extrudate rope does not completely fill the die indentation 3.

In FIG. 7, a force F is shown acting upon the die.

Figure 9:
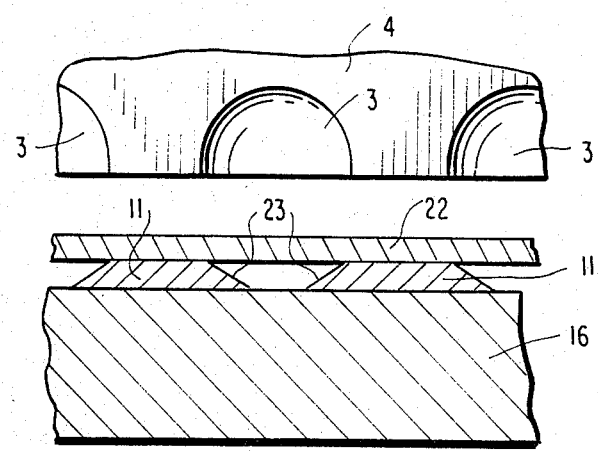
FIG. 9 is a front sectional view showing an alternate embodiment of the shims of the present invention.

An alternative embodiment of the shims 11 of the present invention is shown in FIG. 9. In this embodiment, the interior facing edges 23 of shims 11,11 in FIG. 9 are not vertical but rather slope or taper in an angle to partially underlie the area lying under an indentation 3. As in the main embodiment, shims 11 are each approximately 0.015 inch in thickness. Also, the shims 11 are preferably formed of resilient material such as rubber, plastic, steel, or the like. Note that, except for the end shims, ecah shim 11 is tapered on each of its elongated edges as shown. End shims 11 need be tapered on only one edge.

In operation, conveyor belt 13 is supported by a roller 14 to deliver an extrudate rope 10 to a second conveyor belt 22 which in turn is supported by a roller 15. Other rollers and means for driving the rollers are not shown, but are conventional in the art of supporting and driving conveyor belts.

The extrudate rope 10 travels under a die having indentations 3. The die is driven upward and downward in a stamping operation to form pieces 12 from the extrudate rope 10. It is conventional in the stamping art to drive a die upward against a spring and then on the downstroke allow the stored energy of the spring and the momentum of the die to perform the stamping. It is also conventional to have the die both on the upstroke as well as on the downstroke.

During the bottom of the downstroke, and the beginning of the upstroke, the die matches the velocity V of the conveyor belt 22. This minimizes distortion of the extrudate rope which would otherwise be caused by any disparity between the velocity of the die and the extrudate rope 10.

The extrudate rope can be any viscous, fluidic material. In the present invention, the extrudate rope 10 is composed of cookie dough. The stamping operation thus creates pieces 12 which are baked to form baked goods. However, it is contemplated any of a variety of baked goods may be formed, for example baked goods that are baked from dough pieces having an outer layer of farinacious dough and a core which may be a dissimilar dough or another material such as a jam, cream, puree, paste, or other extrudable form of fruit, cheese, meat, vegetable, confection or other edible substance."

During stamping, downward movement of the die initially deforms the extrudate outward beyond the areas beneath indentations 3. As the die continues downward, however, the lower die surface 1 squeezes the spread-out portions of extrudate rope 10 between surface 1 and belt 22. The squeezing action begins above shims 11, thus forcing the spread-out portions of extrudate rope 10 back under respective indentations 3. The portions of surface 1 between opposed pairs of indentations 3 thus exerts the least force on the extrudate rope, and squeezes portions the extrudate rope 10 from between opposed indentations 3 to form separate pieces 12. The pieces 12 are then conveyed for further processing if such is required, for example baking. The die then travels upward and back for another operation.

In a prototype apparatus according to the present invention, using a particular dough, and employing a die driven both during the upstroke and the downstroke, scrap was reduced from the range of 2–4% to approximately 1%, by introduction of the shims 11. Nonetheless, scrap loss varies with the forces applied to the die, the particular dough, shim thickness and the speed of operation. In a preferred embodiment of the present invention, the shims 11 have a thickness of 0.015 inch; nonetheless, any desired shim thickness may be employed without departing from the scope of the present invention.

The improved casing of the present invention is capable of achieving the above-enumerated objects and while preferred embodiments of the present invention have been disclosed, it will be understood that it is not limited thereto but may be otherwise embodied within the scope of the following claims.

What is claimed is:

1. An apparatus for producing separate pieces from an extrudate rope, comprising:
    a die having a generally flat lower surface;
    a means for driving the die in a cyclic operation having an upstroke and a downstroke, in which, at some point in the cycle, the die travels with a downward velocity as well as a forward velocity;
    a means for conveying an extrudate rope under said generally flat surface of said die said forward velocity being in the direction of conveyor movement;
    and shims underlying predetermined portions of said die;
    said means for conveying overlying said shims;
    and a support underlying said means for conveying and said shims;
    said die having opposed pairs of indentations formed therein;
    said indentations opening into said lower surface of said die;
    said opposing pairs of indentations lying generally in a straight line along a forward direction of travel of the extrudate rope;
    and said shims underlie predetermined portions of said die between said indentations, so that during the downstroke, extrudate between said shims is forced toward said indentations;
    whereby, the die moves downward against the extrudate rope to separate the extrudate rope into pieces, the lower surface of the die and the shims having dough forced therebetween toward areas where no shims are present, thereby minimizing scrap loss; and whereby during a downstroke, the die forms a trailing edge of a leading piece as well as a leading edge of a trailing piece.

2. An apparatus as claimed in claim 1, wherein said shims have inclined edges connecting said top and said bottom surfaces;
    said inclined edges beginning at said top surface at a location not underlying any of said opposing pairs of indentations, and terminating at said bottom surface in an area underlying said opposed pairs of said indentations.

3. An apparatus as claimed in claim 1, wherein said shims are formed as thin elongated strips having generally parallel top and bottom surfaces defining a predetermined thickness,
    and said shims have inclined edges connecting said top and bottom surfaces.

4. An apparatus as claimed in claim 1 above, wherein said shims are formed as thin strips having generally parallel top and bottom surfaces defining a predetermined thickness,
    and vertical sides such that no portion of any of said shims underlies any portion of the path traveled by any of said opposed pairs of indentations.

5. An apparatus as claimed in claim 4, wherein said extrudate rope is cookie dough;
    whereby separation of said extrudate rope into pieces forms cookie dough into individual cookies.

6. An apparatus as claimed in claim 4, wherein said indentations comprise a portion of an ellipsoid.

7. An apparatus as claimed in claim 4, wherein said indentations comprise a prismatic rectangular shape.

8. An apparatus as claimed in claim 4, wherein the interior surface of said indentations has a raised pattern formed thereon;
    whereby a pattern is formed on the pieces of extrudate rope formed during the stamping operation.

9. An apparatus as claimed in claim 4, wherein said die is driven by said means for driving in an upward direction on the upstroke and is driven in a downward direction on the downstroke.

10. An apparatus as claimed in claim 4, wherein said die is driven upward by said means for driving against the force of a resilient member;
    and on the downstroke said die is driven downward by the release of stored energy in said resilient member.

11. An apparatus as claimed in claim 10, wherein said resilient member is a helical spring.

12. An apparatus as claimed in claim 4, wherein said extrudate rope has an outer layer of farnacious dough and a core of dissimilar material, whereby scrap material left between said pieces cannot be reused without contaminating the outer layer material or the core material.

13. An apparatus as claimed in claim 4, wherein said outer layer is formed from cookie dough.

14. An apparatus as claimed in claim 13, wherein said core is a dissimilar cookie dough.

15. An apparatus as claimed in claim 13, wherein said core is composed of any extrudable edible substance.

16. An apparatus as claimed in claim 4, wherein said indentations comprise a surface generally having the shape of a portion of a sphere.

17. An apparatus as claimed in claim 16, wherein said die has a vertical leading surface;
    a vertical trailing surface;
    a portion of each leading indentation intersecting a portion of said leading surface and said bottom surface;

a portion of each trailing indentation intersecting said trailing vertical surface and said bottom surface;

whereby during a stamping operation said trailing indentation forms a trailing edge of a piece of extrudate rope, while simultaneously said leading indentation forms a leading edge of a trailing piece of extrudate rope.

18. An apparatus as claimed in claim 17, wherein the intersection of said leading indentations and said leading vertical edge is larger in cross-section than the interior of said leading indentations;

whereby said extrudate rope is guided into said indentations by the larger cross-section of the leading edge.

19. An apparatus for producing separate pieces from an extrudate rope, comprising:

a die having a generally flat lower surface;

a means for driving the die in a cyclic operation having an upstroke and a downstroke, in which the die travels with a downward velocity as well as a forward velocity;

a flexible belt means for conveying an extrudate rope under said generally flat surface of said die said forward velocity being in the direction of conveyor movement;

said shims underlying predetermined portions of said die;

said means for conveying overlying said shims;

and a support underlying said means for conveying and said shims;

said die having at least one indentation therein for forming pieces from an extrudate rope;

said at least one indentation opening into said lower surface of said die;

said shims underlie predetermined portions of said die adjacent said at least one indentation, so that during the downstroke, extrudate between said shims is forced toward said indentations;

said shims being thin strips having generally parallel top and bottom surfaces having a generally uniform a predetermined thickness;

said shims each having a vertical edge adjacent said at least one indentation such that generally no portion of said shims directly underlies said at least one indentation;

said vertical edge of each of said shims being disposed generally parallel to and on either side of the path of travel of the extrudate rope;

whereby when the die moves downward against the extrudate rope to separate the extrudate rope into pieces, the lower surface of the die having said at least one indentation therein and the shims forcing dough between vertical edges of said shims toward areas on said flexible belt means for conveying directly beneath said at least one indentation where no shims directly underlie said at least one indentation, thereby minimizing scrap loss caused by spreading of the extrudate rope by said die during formation of pieces by said at least one indentation.

20. An apparatus as claims in claim 19, wherein the extrudate rope is cookie dough;

whereby separation of said extrudate rope into pieces forms cookie dough into individual cookies.

21. An apparatus as claimed in claim 2, wherein said at least one indentation comprises a surface generally having the shape of a portion of a sphere.

22. An apparatus as claimed in claim 2, wherein said at least one indentation comprises a portion of an ellipsoid.

23. An apparatus as claimed in claim 2, wherein said at least one indentation comprises a prismatic rectnagular shape.

24. An apparatus as claimed in claim 2, wherein the interior surface of said at least one indentation has a pattern formed thereon;

whereby a corresponding pattern is formed on the pieces of extrudate rope formed during the stamping operation.

25. An apparatus as claimed in claim 2, wherein said die has a vertical leading surface;

a vertical trailing surface;

a portion of said at least one indentation intersecting a portion of said leading surface and said bottom surface.

26. An apparatus as claimed in claim 25, wherein the intersection of said at least one indentation and said leading vertical edge is larger in cross-section than the interior of said at least one indentations;

whereby said extrudate rope is guided into said at least one indentation by the large cross-section of the leading edge.

27. An apparatus as claimed in claim 2, wherein said shims have inclined edges connecting said top and said bottom surfaces;

said inclined edges beginning at said top surface at a location not underlying any portion of said at least one indentation, and terminating at said bottom surface in an area underlying at least a portion of said at least one indentation.

28. An apparatus as claimed in claim 2, wherein the extrudate rope has an outer layer of farinacious dough and a core of dissimilar material, whereby scrap material left on said flexible belt means between said pieces formed by said at least one indentation cannot be reused without contaminating by mixing the outer layer material or the core material, thus preventing recycling of the scrap material into either the outer layer in the core material supply.

29. An apparatus as claimed in claim 28, wherein said outer layer is formed from cookie dough.

* * * * *